(12) United States Patent
Chaubey

(10) Patent No.: US 11,575,662 B2
(45) Date of Patent: *Feb. 7, 2023

(54) TRANSMITTING AND STORING DIFFERENT TYPES OF ENCRYPTED INFORMATION USING TCP URGENT MECHANISM

(71) Applicant: Juniper Networks, Inc., Sunnyvale, CA (US)

(72) Inventor: Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/400,654

(22) Filed: May 1, 2019

(65) Prior Publication Data

US 2020/0053063 A1 Feb. 13, 2020

Related U.S. Application Data

(63) Continuation of application No. 16/057,628, filed on Aug. 7, 2018, now Pat. No. 10,291,598.

(51) Int. Cl.
*H04L 29/06* (2006.01)
*H04L 9/40* (2022.01)

(52) U.S. Cl.
CPC ...... *H04L 63/0471* (2013.01); *H04L 63/0464* (2013.01); *H04L 63/1433* (2013.01); *H04L 63/166* (2013.01); *H04L 63/168* (2013.01)

(58) Field of Classification Search
CPC ..... H04L 63/04; H04L 63/166; H04L 63/168; H04L 63/0471; H04L 63/0464; H04L 63/1433
See application file for complete search history.

(56) References Cited

U.S. PATENT DOCUMENTS

| | | | |
|---|---|---|---|
| 6,594,246 B1 | 7/2003 | Jorgensen et al. | |
| 6,975,647 B2 | 12/2005 | Neale et al. | |
| 7,159,030 B1* | 1/2007 | Elzur | H04L 47/2475 710/29 |
| 7,373,500 B2 | 5/2008 | Ramelson et al. | |
| 8,341,724 B1* | 12/2012 | Burns | H04L 63/145 726/13 |
| 9,338,147 B1 | 5/2016 | Rothstein et al. | |
| 9,571,354 B2 | 2/2017 | Annamalaisami et al. | |

(Continued)

Primary Examiner — Wasika Nipa
(74) Attorney, Agent, or Firm — Harrity & Harrity, LLP

(57) ABSTRACT

A network device decrypts a record, received from a client device, that is associated with an encrypted session between the client device and an application platform. The network device incorporates decrypted record data, from the decrypted record, into a payload field of a transmission control protocol (TCP) packet to be transmitted to another device, identifies a record header in the record, and determines, based on the record header, a record type associated with the decrypted record. Based on the record type, the network device marks the one or more TCP packets as including urgent data by setting a TCP urgent control bit in a header of the one or more TCP packets, and sets a second field, in the header of the TCP packet, to a second value that identifies an end of the urgent data, which corresponds to an end of the decrypted record data in the payload field.

20 Claims, 10 Drawing Sheets

(56) References Cited

U.S. PATENT DOCUMENTS

| | | | |
|---|---|---|---|
| 10,291,598 B1 | 5/2019 | Chaubey | |
| 2003/0123481 A1* | 7/2003 | Neale | H04L 47/193 |
| | | | 370/466 |
| 2004/0034773 A1* | 2/2004 | Balabine | A63F 13/12 |
| | | | 713/168 |
| 2004/0088571 A1* | 5/2004 | Jerrim | H04L 63/1416 |
| | | | 726/1 |
| 2004/0192312 A1* | 9/2004 | Li | H04W 28/0273 |
| | | | 455/445 |
| 2004/0250059 A1* | 12/2004 | Ramelson | H04L 63/0428 |
| | | | 713/150 |
| 2005/0050316 A1 | 3/2005 | Peles et al. | |
| 2005/0060427 A1 | 3/2005 | Phillips et al. | |
| 2006/0098649 A1* | 5/2006 | Shay | H04L 63/102 |
| | | | 370/389 |
| 2014/0140342 A1* | 5/2014 | Narad | G06F 9/30145 |
| | | | 370/389 |
| 2015/0350068 A1* | 12/2015 | Tung | H04L 43/0811 |
| | | | 370/392 |
| 2016/0099972 A1* | 4/2016 | Qureshi | H04L 63/0428 |
| | | | 726/1 |
| 2016/0219024 A1* | 7/2016 | Verzun | H04L 9/0662 |
| 2017/0195209 A1* | 7/2017 | Singh | H04L 43/10 |

* cited by examiner

TRANSMITTING AND STORING DIFFERENT TYPES OF ENCRYPTED INFORMATION USING TCP URGENT MECHANISM

RELATED APPLICATION

This application is a continuation of U.S. patent application Ser. No. 16/057,628, filed Aug. 7, 2018 (now U.S. Pat. No. 10,291,598), the disclosure of which is incorporated herein by reference.

BACKGROUND

A cryptographic protocol, such as secure sockets layer (SSL) protocol, transport layer security (TLS) protocol, and/or the like, may be used to encrypt a communications session between a first device and a second device. In some cases, the first device and/or the second device may transmit various types of encrypted information in the encrypted session, such as encrypted application data, encrypted alert data, encrypted handshake data, encrypted heartbeat data, and/or the like.

SUMMARY

According to some implementations, a network device may include one or more memories, and one or more processors to decrypt a record received from a client device, wherein the record is associated with an encrypted session between the client device and an application platform. The one or more processors may incorporate decrypted record data, from the decrypted record, into a payload field of one or more transmission control protocol (TCP) packets to be transmitted to another device, may identify a record header included in the decrypted record, and may determine, based on information included in the record header, a record type associated with the decrypted record. Based on the record type being a non-application data record type, the one or more processors mark the one or more TCP packets as including urgent data by setting a TCP urgent control bit in a header of the one or more TCP packets, and may set a pointer field, included in the header of the one or more TCP packets, to a value that identifies an end of the urgent data in the payload field, which corresponds to an end of the decrypted record data in the payload field. The one or more processors may transmit the one or more TCP packets to the other device, wherein the other device is to at least one of: store the one or more TCP packets, or analyze the decrypted record data.

According to some implementations, a non-transitory computer-readable medium may store instructions that include one or more instructions that, when executed by one or more processors of a device, cause the one or more processors to decrypt a record received from a client device, wherein the record is associated with an encrypted session between the client device and an application platform. The one or more instructions may cause the one or more processors to incorporate decrypted record data, from the decrypted record, into a payload field of one or more transmission control protocol (TCP) packets to be transmitted to another device, to identify a record header included in the decrypted record, and to determine, based on information included in the record header, a record type associated with the decrypted record. Based on the record type being a non-application data record type, the one or more instructions may cause the one or more processors to mark the one or more TCP packets as including urgent data by setting a TCP urgent control bit in a header of the one or more TCP packets, and to set a pointer field, included in the header of the one or more TCP packets, to a value that identifies an end of the urgent data in the payload field, which corresponds to an end of the decrypted record data in the payload field. The one or more instructions may cause the one or more processors to transmit the one or more TCP packets to the other device, wherein the other device is to at least one of: store the one or more TCP packets, or analyze the decrypted record data.

According to some implementations, a method may include decrypting, by a network device, a record received from a client device, wherein the record is associated with an encrypted session between the client device and an application platform. The method may include incorporating, by the network device, decrypted record data, from the decrypted record, into a payload field of one or more transmission control protocol (TCP) packets that are to be transmitted to another device, identifying, by the network device, a record header included in the decrypted record, and determining, by the network device and based on information included in the record header, a record type associated with the decrypted record. Based on the record type being a non-application data record type, the method may include marking the one or more TCP packets as including urgent data by setting a TCP urgent control bit in a header of the one or more TCP packets, setting, by the network device, a pointer field, included in the header of the one or more TCP packets, to a value that identifies an end of the urgent data in the payload field, which corresponds to an end of the decrypted record data in the payload field, and incorporating, by the network device, the information, included in the record header, into the one or more TCP packets. The method may include transmitting, by the network device, the TCP packet to the other device, wherein the other device is to at least one of: store the one or more TCP packets, or analyze the decrypted record data.

DETAILED DESCRIPTION

Figure 1A:
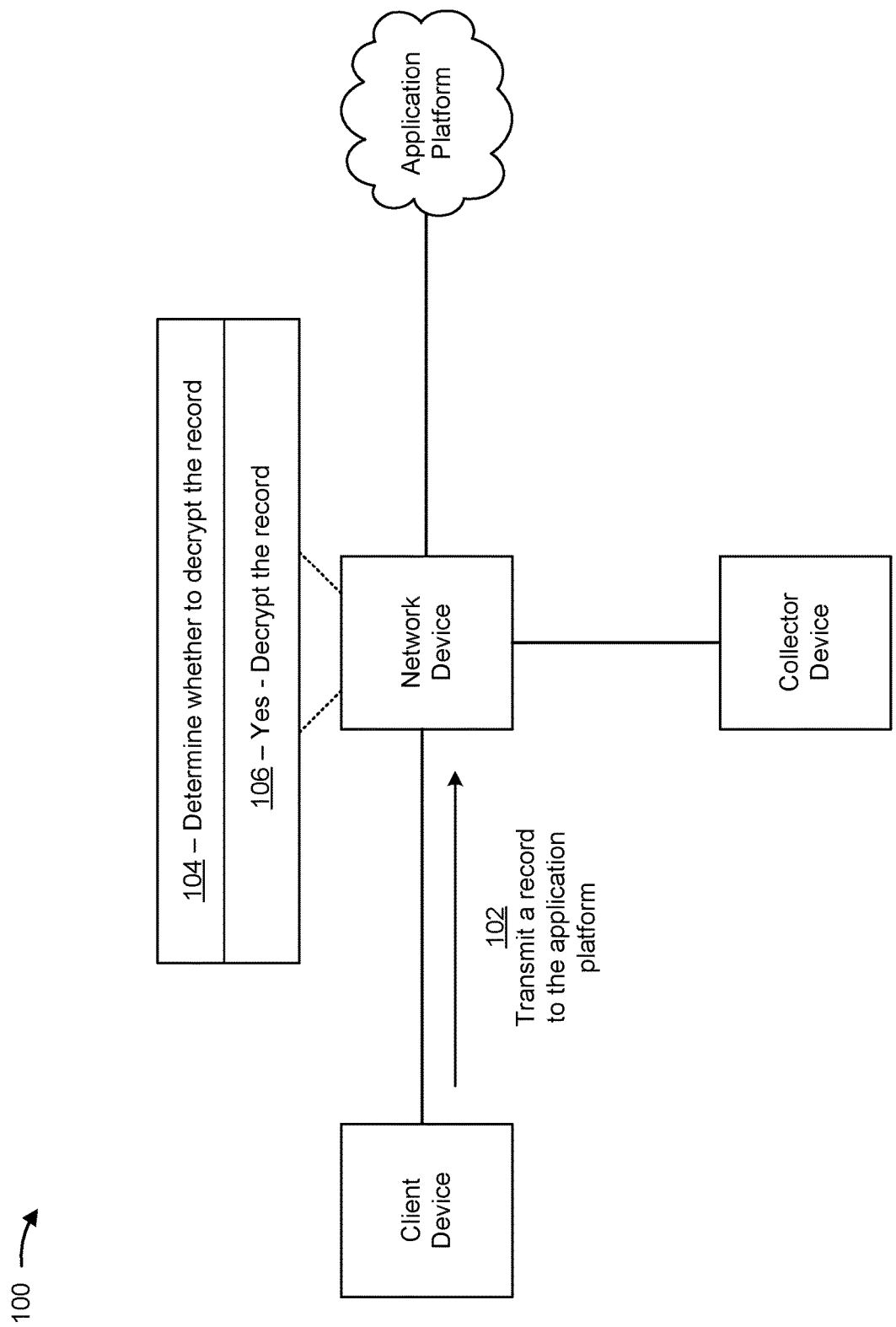
FIGS. 1A-1C are diagrams of an example implementation described herein.

The following detailed description of example implementations refers to the accompanying drawings. The same reference numbers in different drawings may identify the same or similar elements.

In some cases, a first device, such as a client device, may transmit encrypted application data to a second device, such as an application platform, via a third device, such as a network device. In some cases, the network device may decrypt the encrypted application data and port mirror the decrypted application data such that the decrypted application data may be transmitted to a fourth device to be stored, analyzed, and/or the like. While the decrypted data is transmitted to the fourth device, the encrypted data transfer between the client device and the application platform may continue.

In some cases, the client device and/or the application platform may transmit additional encrypted information (which may be referred to herein as encryption context information), such as encrypted handshake data, encrypted alert data, encrypted heartbeat data, and/or the like. In order to facilitate transfer of encrypted application data between the client device and the application platform, the underlying encryption protocol, such as SSL and/or TLS, may exchange additional data and information. Such an encryption protocol may generate a key to be used for encryption and decryption by means of key exchange mechanism such as a SSL and/or TLS handshake. Further, the underlying encryption protocol may have the means to exchange information related to an encrypted session, such as information identifying whether a peer is alive or not by exchanging heartbeat messages (e.g., TLS heartbeat messages). Moreover, the underlying encryption protocol may also have the means to exchange information associated with an error or anomaly related to transfer of application data between peers. For example, TLS alert may be one such mechanism.

The above additional information may be used to determine forensic insights. For example, a TLS alert may be generated for repeated bad message authentication code (MAC) that may be an indicator of an attack. As another example, TLS handshake and renegotiation might give insight into parameters negotiated for key generation.

While the above-described encryption context information may be useful for threat analysis, forensic analysis, and/or the like, in some cases, the network device may not provide the encryption context information to the fourth device for analysis and/or record keeping, which reduces the ability of the fourth device to perform the analysis and to identify and prevent threats, which in turn causes the encrypted session between the client device and the application platform to be less secure. In some cases, where the network device does provide the encryption context information to the fourth device, it may be difficult for the network device to transmit the encryption context information to the fourth device without the encryption context information intermingling with the decrypted application data, which can render the decrypted application data unusable for analysis purposes.

Some implementations described herein provide a network device that is capable of transmitting encryption context information in a way that prevents the encryption context information from intermingling with decrypted application data. In some implementations, the network device may decrypt a record received from a client device, and may incorporate the decrypted record data, from the decrypted record, into a payload field of one or more transmission control protocol (TCP) packets to be transmitted to another device. The record may be associated with an encrypted session between the client device and an application platform. The network device may identify a record header included in the decrypted record, and may determine, based on information included in the record header, a record type associated with the decrypted record. Based on the record type being a non-application data record type, the network device may set a first field, included a header of the one or more TCP packets, to a first value that indicates the payload field of the one or more TCP packets includes urgent data, and may set a second field, included in the header of the one or more TCP packets, to a second value that identifies an end of the urgent data in the payload field, which corresponds to an end of the decrypted record data in the payload field. The network device may transmit the one or more TCP packets to the other device, wherein the other device is to at least one of: store the one or more TCP packets, or analyze the decrypted record data.

In this way, the network device may transmit decrypted encryption context information in one or more TCP packets by setting a field, such as a TCP urgent control bit, in a header of the one or more TCP packets to identify the decrypted encryption context information being transmitted in a payload of the one or more TCP packets. This allows the decrypted encryption context information to be received by the decrypted data store and stored in a way that prevents the encryption context information from comingling with decrypted application data transmitted in the encrypted session associated with the client device and the application platform. Accordingly, this allows the network device, an intrusion detection device, a threat detection device, and/or the like to use the decrypted encryption information to perform threat analysis, forensic analysis, and/or the like, which improves the ability of the network device and/or the other device to perform the threat analysis, forensic analysis, and/or the like, which in turn improves the security of sessions encrypted using TLS, SSL, and/or the like.

Figure 1B:
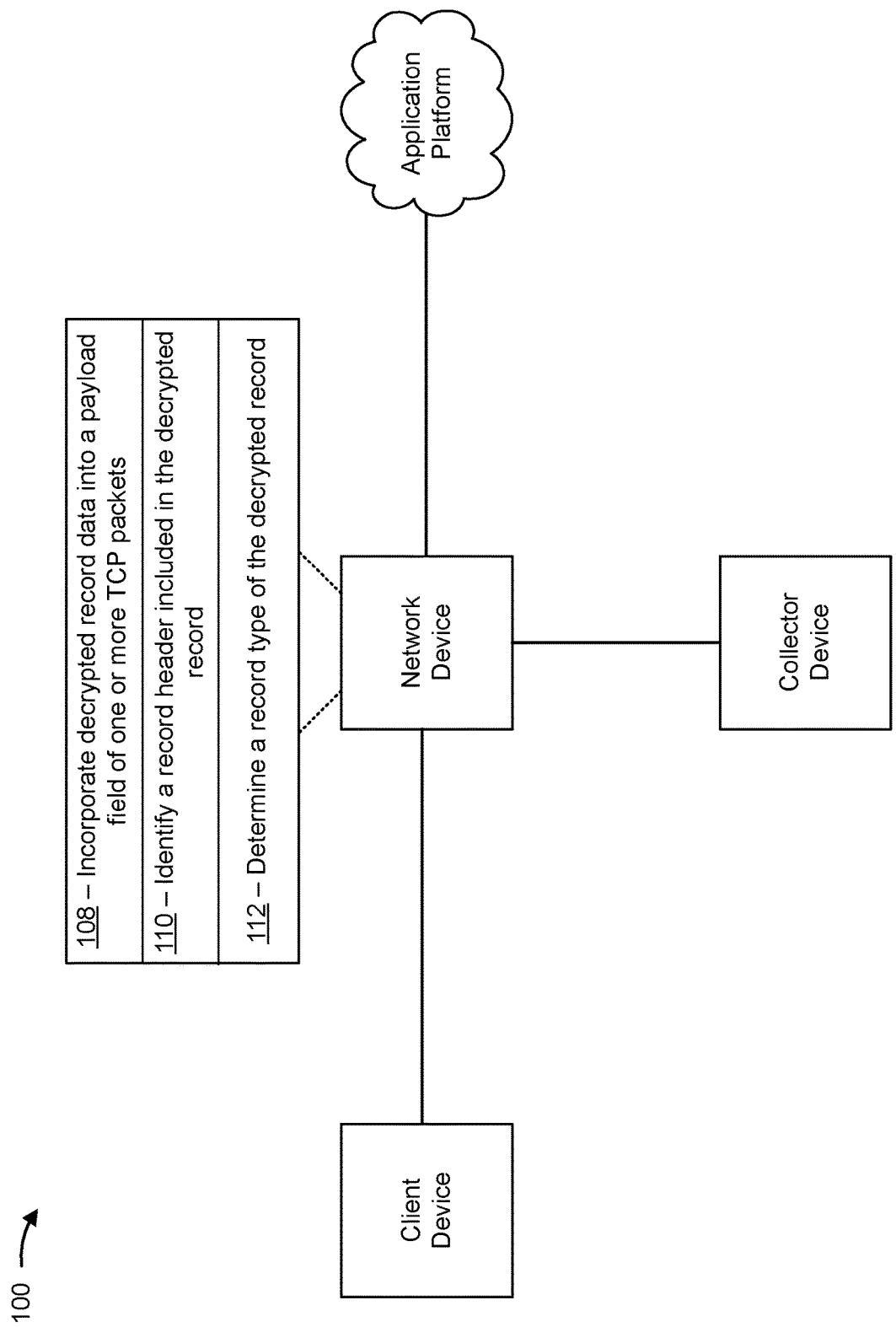
Figure 1C:
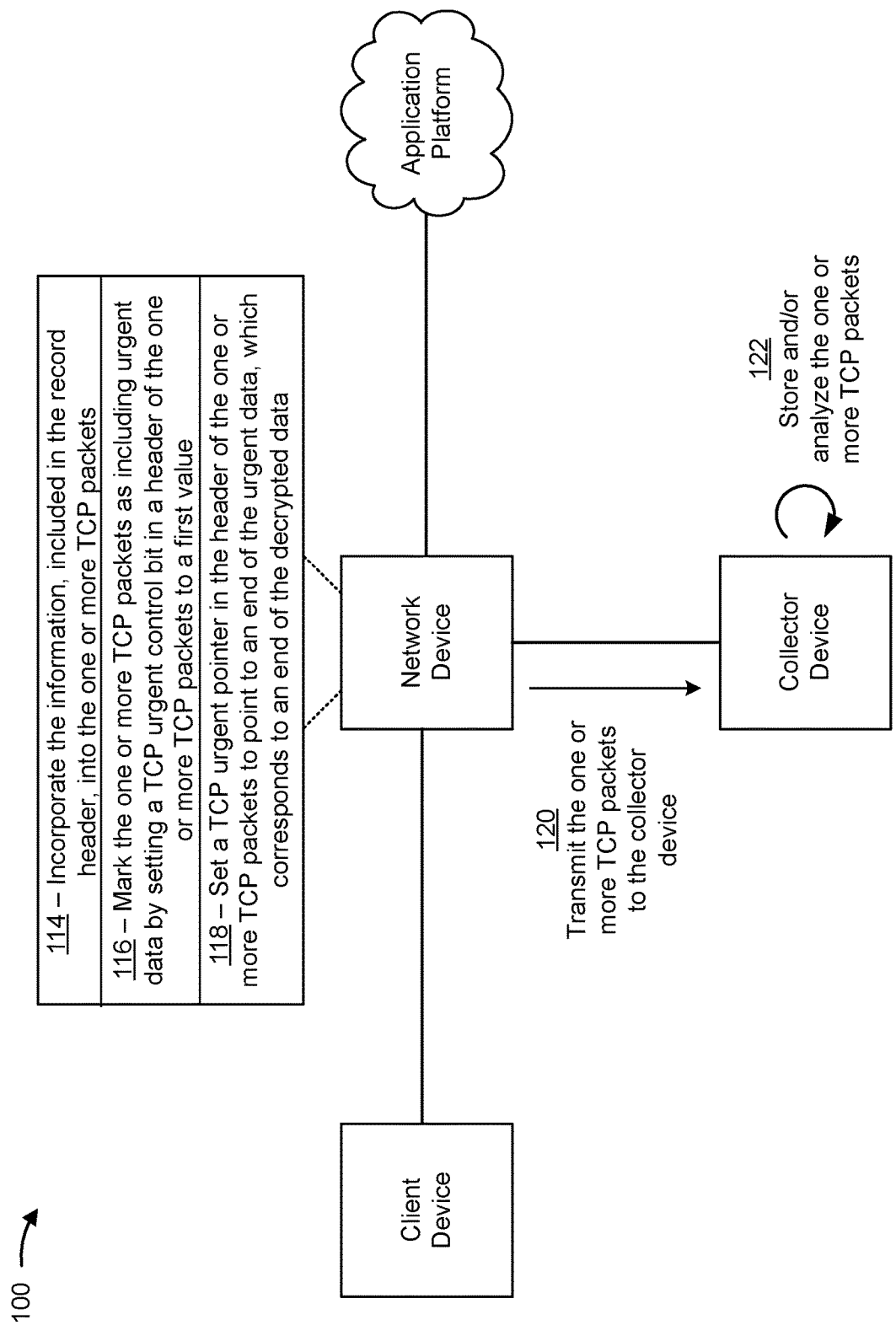

FIGS. 1A-1C are diagrams of an example implementation 100 described herein. As shown in FIGS. 1A-1C, implementation may include various devices, such as a client device, a network device, a collector device, an application platform, and/or the like.

In some implementations, the application platform may be associated with, and/or may host, a software application, such as a productivity suite application (e.g., a word processing application, a spreadsheet application, etc.), a customer relationship management application, and/or the like, such that the client device may interact with the application platform to interact with the software application, to transmit and/or receive information associated with the application, and/or the like. In some implementations, the application platform may be a web server that hosts web content (e.g., web pages, audio and/or video streaming services, etc.), may be a file hosting server, and/or the like, such that the client device may request content stored by the application platform (e.g., electronic files, videos, images, etc.), may transmit content to the application platform to be stored by the application platform, and/or the like.

In some implementations, the client device and the application platform may be communicatively connected via the network device. The client device and the application platform may communicate in a session using the connection. In some implementations, the session may be encrypted using SSL encryption, TLS encryption, and/or the like, such that the client device and/or the application platform may transmit encrypted information via the encrypted session. For example, the application platform may transmit a security credential, such as a certificate, a key, and/or the like, to the client device so that the client device may authenticate the application platform, and/or vice-versa.

The client device and/or the application platform may transmit and/or receive encrypted information in the encrypted session. In some implementations, the client device and/or the application platform may transmit and/or receive encrypted application data. For example, the client device may transmit encrypted application data via a hypertext transfer protocol secure (HTTPS) request (e.g., a GET request for a webpage, a GET request for a file, a POST request to upload a file to the application platform, etc.) and/or the like. As another example, the application platform may transmit encrypted application data via an HTTPS response (e.g., a response to an HTTPS request, from the client device, for a webpage, for a file, etc.), and/or the like.

In some implementations, the client device and/or the application platform may transmit and/or receive encryption context information, such as encrypted alert data, encrypted handshake data, encrypted heartbeat data, other types of TLS information, other types of SSL information, and/or the like. For example, the client device and/or the application platform may transmit handshake data to establish the encrypted session between the client device and the application platform, to renegotiate the encrypted session, and/or the like. As another example, the client device and/or the application platform may transmit and/or receive encrypted heartbeat data to maintain the encrypted session between the client device and the application platform. The encrypted heartbeat data may include a heartbeat request packet (e.g., a request to provide a heartbeat response packet) and/or a heartbeat response packet (e.g., a response to a heartbeat request packet), and/or the like. As a further example, the client device and/or the application platform may transmit and/or receive encrypted alert data associated with a cryptographic operation failure, a record inconsistency, and/or the like.

In some implementations, the network device may function as man-in-the-middle in the encrypted session such that the network device may decrypt the encrypted information transmitted by the client device and/or the application platform. For example, the network device may store a copy of the security credential associated with the application platform and/or the client device, and may use the security credential to decrypt encrypted information transmitted by the client device to the application platform. As another example, the network device may be communicatively connected to a certificate authority and/or another type of security credential generating device, and the network device may use the certificate authority to generate security credentials to decrypt encrypted information transmitted by the client device and/or the application platform.

In some implementations, the network device may be configured to decrypt all encrypted information received at the network device, may be configured to decrypt encrypted information associated particular applications (e.g., based on a policy rule specifying that encrypted information associated with a particular type of application (e.g., a web browser, an email client, etc.) is to be decrypted, based on being configured to decrypt encrypted information associated with a particular application, etc.), may be configured to decrypt encrypted information associated with a particular source (e.g., based on a source address, such as an Internet protocol (IP) address, based on an interface identifier, such as a port identifier, etc.), may be configured to decrypt encrypted information associated with a particular destination (e.g., based on a destination address, based on a port identifier, etc.), and/or the like.

In some implementations, the network device may be configured to port mirror encrypted information that has been decrypted. For example, the network device may configure an interface of the network device to transmit a copy of the decrypted information to the collector device. In this way, the network device may re-encrypt the information so that the re-encrypted information may be transmitted to the intended destination of the information (e.g., the client device, the application platform, etc.) such that the client device and the application platform are not aware that there is a man-in-the-middle between the client device and the application platform.

The collector device may be various types of devices, such as a decrypted data store device (e.g., a storage device, such as a hard drive, a database, a network-attached storage (NAS), and/or the like, that is configured to store data decrypted by the network device), a network analyzer or security appliance (e.g., a device capable of analyzing the decrypted information (e.g., to perform traffic analysis, forensic analysis, threat analysis, and/or the like, for the decrypted information), another network device, and/or the like.

Turning to FIG. 1A, and as shown by reference number 102, the client device may transmit a record to the application platform via the encrypted session. For example, the client device may generate the record, may encrypt the record (e.g., using SSL encryption, TLS encryption, etc.), and may transmit the record to the application platform. In some implementations, the client device may be instructed (e.g., by a user, by an application included on the client device, by an application included on the application platform, etc.) to generate and transmit the record, may automatically generate and transmit the record, for example, to establish the encrypted session with the application platform (e.g., by automatically generating and transmitting an encrypted handshake packet), to maintain the encrypted session with the application platform (e.g., by automatically generating and transmitting an encrypted heartbeat request packet, by automatically generating and transmitting an encrypted heartbeat response packet based on receiving an encrypted heartbeat packet, etc.), based on detecting an event associated with the encrypted session (e.g., by automatically generating and transmitting an encrypted alert packet based on detecting any of the events described above and/or other types of TLS events, SSL events, etc.), and/or the like.

In some implementations, the record may be a TLS record, a SSL record, and/or the like. The record may include a header and record data. The record header may include information identifying a record type of the record (e.g., a content type field including an identifier associated with the record type, a flag identifying the record type, a bit that, when set, identifies a particular record type, etc.), information identifying a length of the data (e.g., a length field identifying a quantity of bits included in the data, identifying a quantify of bytes included in the record data, etc.), information identifying a type and/or version of encryption used to encrypt the record (e.g., TLS v1.2, SSL v3.0, etc.), and/or the like. The record data may be various types of encrypted information, such as encrypted application data, encrypted handshake data, encrypted heartbeat data, encrypted alert data, and/or the like.

The network device may receive the record from the client device. As shown by reference number 104, the network device may determine whether to decrypt the record. As explained above, the network device may be configured to decrypt all received encrypted records, may be configured to decrypt particular records, such as records associated with a particular application, records associated with a particular source and/or destination, and/or the like. Accordingly, in some implementations, the network device may inspect the record to determine the source, the destination, the application, and/or the like, associated with the record so that the network device may determine whether to decrypt the record.

As shown by reference number 106, the network device may determine to decrypt the record and, accordingly, may decrypt the record. To decrypt the record, the network device may decrypt the record data included in the record.

In some implementations, to decrypt the record data, the network device may use the security credential, associated with the application platform and signed by the application platform, stored at the network device or another location to decrypt the record data (which in some cases may be referred to as a reverse proxy). As another example, the network device may intercept the initiation (e.g., the handshake) of the encrypted channel, may use a certificate authority or another type of security credential generating entity to generate the security credential (e.g., such that the security credential appears to be associated with the application platform), may self-sign the security credential, may provide the security credential to the client device to complete the handshake during the initiation of the encrypted session (which may be referred to as a forward proxy). Accordingly, the network device may appear as the application platform to the client device, which allows the network device to decrypt encrypted records transmitted by the client device.

In some implementations, after decrypting the record, the network device may port mirror the decrypted record by providing a copy of the decrypted record onto an interface associated with the network device that is configured for port mirroring. In this way, the network device may re-encrypt the record, and may transmit the re-encrypted record on the encrypted session to the application platform such that the record is transmitted to its intended destination, and so that the client device and/or the application platform does not experience any interruption in service on the encrypted session.

Turning to FIG. 1B, the network device may generate one or more TCP packets (which may also be referred to as a TCP segments) to transmit the decrypted record data to the collector device. As shown by reference number 108, to generate the one or more TCP packets, the network device may incorporate the decrypted record data into a payload of the one or more TCP packets. For example, if the record data included in the record is encrypted alert data, the network device may incorporate the decrypted alert data into the payload of the one or more TCP packets. As another example, if the record data included in the packet is encrypted application data, the network device may incorporate the decrypted application data into the payload of the one or more TCP packets.

As shown by reference number 110, the network device may identify the record header included in the record. As shown by reference number 112, the network device may determine, based on the record header, the record type of the decrypted record. As explained above, the record header may include information identifying the record type. Accordingly, the network device may identify, in the information included in the record header of the decrypted record, the information identifying the record type of the decrypted record, and may determine the record type based on the information identifying the record type. For example, the network device may determine that the decrypted record is an application record based on the information, identifying the record type, included in the record header including an identifier associated with application data. As another example, the network device may determine that the decrypted record data is a heartbeat record based on the information, identifying the record type, included in the record header including a bit set in a field associated with heartbeat data.

Turning to FIG. 1C, and as shown by reference number 114, the network device may incorporate information from the record header of the packet into the payload of the one or more TCP packets along with the decrypted record data. For example, the network device may include the information identifying the record type of the decrypted record, the information identifying the length of the decrypted record data, the information identifying a type and/or version of encryption used to encrypt the record, and/or the like. Accordingly, the network device may update the information so that the information identifies the length of the decrypted record data. In some implementations, the network device may modify the information identifying the length of the record data so that the information identifies the length of the decrypted payload data. For example, the length of the record data, as included in the encrypted record, may have changed after being decrypted. In some implementations, the network device may incorporate other information into the payload of the one or more TCP packets along with the decrypted record data and record header information. For example, the network device may incorporate the information identifying the source of the record, the information identifying the destination of the record, information identifying a time and/or date the record was sent, and/or the like. In this way, the information from the record header of the record, and the other information, may be used to augment the ability of the collector device or other device to perform forensic analysis, threat analysis, and/or the like, of the decrypted record data.

In some implementations, the network device may incorporate various types of information into a header of the one or more TCP packets. For example, the network device may include information identifying a source of the one or more TCP packets (e.g., information identifying an address and/or interface of the network device), information identifying a destination of the one or more TCP packets (e.g., information identifying an address and/or an interface of the collector device), information identifying a sequence number (e.g., if the one or more TCP packets included in a sequence with a plurality of other TCP packets), information identifying a categorization of the decrypted record data included in the decrypted record, and/or the like.

As shown by reference number 116, the network device may set, based on the record type, a first field in the header of the one or more TCP packets to a first value. The first field may indicate the categorization of the decrypted record data included in the payload of the one or more TCP packets. In some implementations, the network device may use the first field to separate the record header information and the decrypted record data from other information and/or data included in the payload of the one or more TCP packets, such as decrypted application data associated with the session between the client device and the application platform. The first value may include an identifier associated with the categorization, a flag identifying the categorization, a control bit that, when set, identifies the categorization, and/or the like. For example, the first field may be a TCP urgent control bit-that, when set in the header of the one or more TCP packets, indicates that the payload of the one or more TCP packets includes urgent data, and the first value may be a bit set to a 1-value indicating that the TCP urgent control bit is set or a 0-value indicating that the TCP urgent control bit is not set, or vice versa. The network device may use the TCP urgent control bit to identify encryption context information included in the payload of the one or more TCP packets. Accordingly, the network device may set the TCP urgent control bit to a 1-value when the decrypted payload data includes encryption context information (e.g., decrypted handshake data, decrypted heartbeat data, decrypted alert data, etc.), and/or may set the TCP urgent control bit to a 0-value when the decrypted payload data does not include encryption context information.

As shown by reference number 118, the network device may set, based on the payload type, a second field in the header of the one or more TCP packets to a second value. The second field may be a pointer that identifies a location in the payload of the one or more TCP packets. In some implementations, the second field may be a TCP urgent pointer, and the second value may be used to identify a location, in the payload of the one or more TCP packets, associated with the TCP urgent control bit. For example, the second value may include information identifying a location, in the payload of the one or more TCP packets, where data associated with the TCP urgent control bit starts, where the data associated with the TCP urgent control bit ends, and/or where data not associated with the TCP urgent control bit begins, an address range of the data associated with the TCP urgent control bit, and/or the like. Accordingly, the network device may set the second value, in the second field of the header of the one or more TCP packets, to indicate where in the payload of the one or more TCP packets that the encryption context information (e.g., decrypted handshake data, decrypted heartbeat data, decrypted alert data, etc.) begins and/or ends, where non-encryption context information (e.g., decrypted application data, etc.) begins and/or ends, and/or the like. For example, if the record type of the decrypted record is an alert record, the network device may set the second value, in the second field of the header of the one or more TCP packets, to indicate where in the payload of the one or more TCP packets that the decrypted alert data, the record header information, and/or the other information ends.

As shown by reference number 120, the network device may transmit the one or more TCP packets to the collector device. For example, the network device may transmit the one or more TCP packets to the collector device via the interface, associated with the network device, configured for port mirroring.

As shown by reference number 122, the collector device may receive the one or more TCP packets, and may store the one or more TCP packets, may analyze the encrypted context information and/or application data included in the payload of the packet, and/or the like. In some implementations, where the collector device is a decrypted data store device, the decrypted data store device may determine that the TCP urgent control bit, in the header of the one or more TCP packets, has been set, may determine where in the payload of the one or more TCP packets that the decrypted record data, the record header information, and/or the other information is located, and may store the decrypted record data, the record header information, and/or the other information. In some implementations, the decrypted data store device may be structured such that information stored by the decrypted data store device is stored by encrypted session. Thus, the decrypted data store device may store the decrypted record data, the record header information, and/or the other information in the location associated with the encrypted session between the client device and the application platform. Moreover, the decrypted data store device may store the decrypted record data, the record header information, and/or the other information separately from non-encryption context information, such as decrypted application data associated with the encrypted session.

Moreover, where the collector device is a network analyzer, intrusion detection device, threat detection device, or another type of device that is capable of performing various types of analyses (e.g., threat analysis, forensic analysis, etc.), the collector device may analyze the data included in the payload of the one or more TCP packets. For example, device may use the information included in the one or more TCP packets to determine whether there was an attack on the encrypted session between the client device and the application platform, to identify a source of the attack, to determine whether there is a vulnerability in the encrypted session, to identify new types of attacks, vulnerabilities, and/or the like, associated with the encryption used for the encrypted session, and/or the like, which increases the security of the client device, the application platform, the encrypted session, and/or overall network security. In some implementations, where the data included in the payload of the one or more TCP packets is decrypted application data, the collector device may analyze the data included in the payload of the one or more TCP packets using an application-specific protocol decoder. In some implementations, where the data included in the payload of the one or more TCP packets is non-application data (e.g., encryption context information), the collector device may analyze the data included in the payload of the one or more TCP packets using an encryption-specific protocol decoder.

In this way, the network device may transmit decrypted encryption context information in one or more TCP packets by setting a field, such as a TCP urgent control bit, in a header of the one or more TCP packets to identify the decrypted encryption context information being transmitted in a payload of the one or more TCP packets. This allows the decrypted encryption context information to be received by the decrypted data store and stored along with decrypted application data transmitted in the encrypted session associated with the client device and the application platform in a way that does not intermingle the decrypted encryption context information and the decrypted application data. Accordingly, this allows the network device, another device (e.g., a network analyzer device, a threat detection device, an intrusion detection device, etc.), and/or the like to use the separately-stored decrypted encryption context information to perform threat analysis, forensic analysis, and/or the like, which improves the ability of the network device and/or the other device to perform the threat analysis, forensic analysis, and/or the like, which in turn improves the security of sessions encrypted using TLS, SSL, and/or the like.

As indicated above, FIGS. 1A-1C are provided merely as an example. Other examples are possible and may differ from what was described with regard to FIGS. 1A-1C. As an example, instead of using the TCP urgent mechanism, the network device may use any other mechanism that is capable accommodating encrypted context information separately from application data, such as using a control channel or out of band data mechanism available in an underlying transport layer of SSL or TLS record support.

Figure 2:
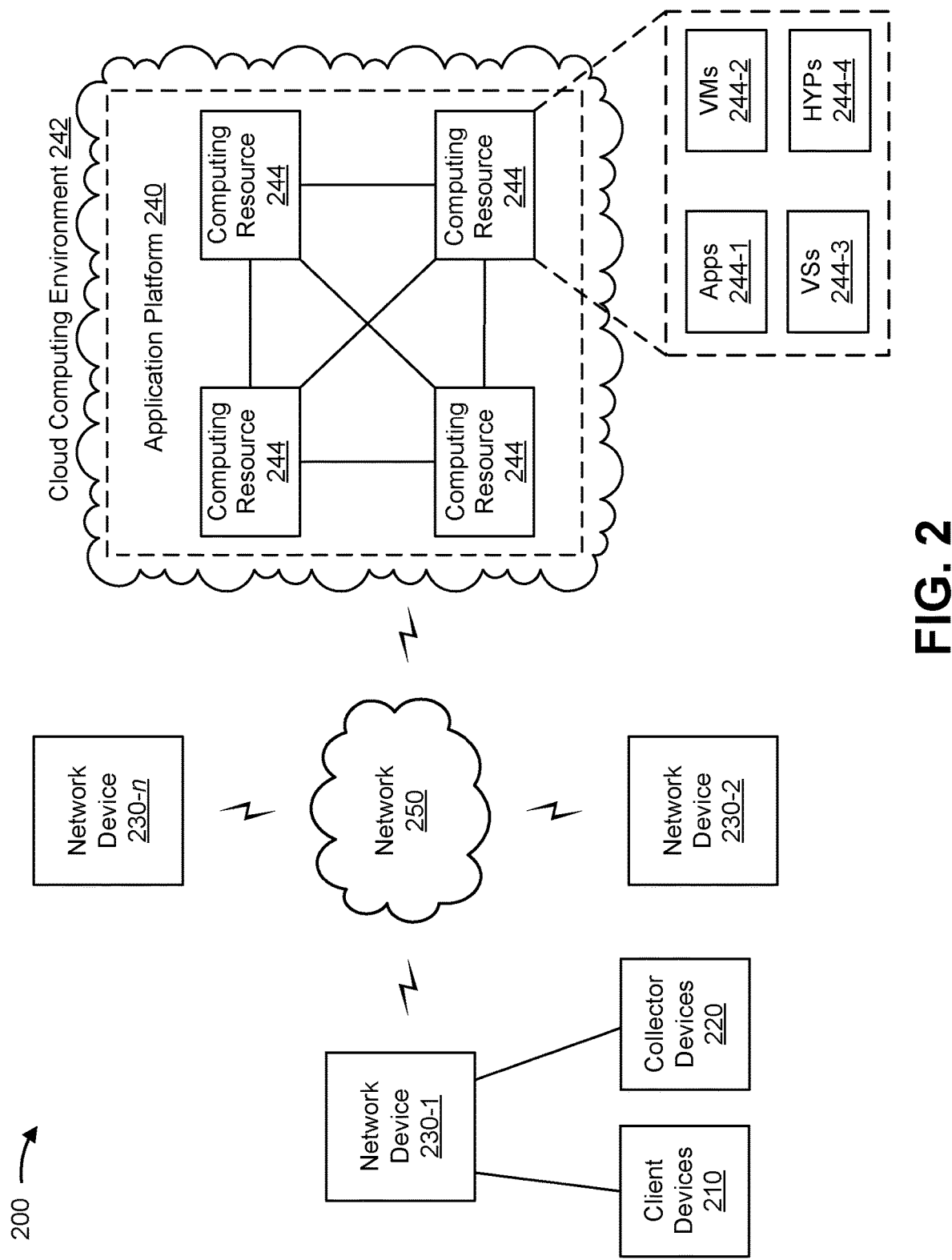
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210 (collectively referred to as "client devices 210" and individually as "client device 210"), a plurality of collector devices 220 (collectively referred to as "collector devices 220" and individually as "collector device 220"), a plurality of network devices (e.g., network device 230-1 through network device 230-n, collectively referred to as "network devices 230" and individually as "network device 230"), an application platform 240 in a cloud computing environment 242 that includes a set of computing resources 244, a network 250, and/or the like. Devices of environment 200 may interconnect via wired connections, wireless connections, or a combination of wired and wireless connections.

Client device 210 includes one or more devices capable of receiving, generating, storing, processing, and/or providing data associated with transmitting different types of encrypted information. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. Client device 210 may be communicatively connected to application platform 240 via network device 230 and may communicate, for example, in a session that is encrypted (e.g., using SSL encryption, TLS encryption, etc.). In some implementations, client device 210 may generate a record, may encrypt the packet (e.g., using SSL encryption, TLS encryption, etc.), and/or may transmit the record to application platform 240 via network device 230. In some implementations, client device 210 may transmit and/or receive encryption context information, such as encrypted alert data, encrypted handshake data, encrypted heartbeat data, other types of TLS information, other types of other types of SSL information, and/or the like.

Collector device 220 includes one or more devices capable of receiving, generating, storing, processing, and/or providing data associated with transmitting different types of encrypted information. For example, collector device 220 may include a storage device, a network analyzer device, a security appliance, a data center, a server device, a cloud platform, another network device, and/or the like. In some implementations, collector device 220 may receive one or more TCP packets from network device 230 (e.g., via an interface, associated with network device 230, configured for port mirroring). In some implementations, collector device 220 may be a decrypted data store device, and may determine that a TCP urgent control bit, in a header of the TCP packet, has been set, may determine where in the payload of the one or more TCP packets that the decrypted record data, the record header information, and/or the other information is located, and may store the decrypted record data, the record header information, and/or the other information, may analyze the decrypted record data, the record header information, and/or the other information, and/or the like.

Network device 230 includes one or more devices capable of receiving, generating, storing, processing, and/or providing data associated with transmitting different types of encrypted information. In some implementations, network device 230 may include a firewall, a router, a load balancer, a gateway, a switch, a bridge, a wireless access point, a base station (e.g., eNodeB, NodeB, gNodeB, and/or the like), and/or the like. In some implementations, network device 230 may be implemented as a physical device implemented within a housing, such as a chassis. In some implementations, network device 230 may be implemented as a virtual device implemented by one or more computer devices of a cloud computing environment or a data center.

In some implementations, network device 230 may receive a record from client device 210, and may determine whether to decrypt the record. In some implementations, network device 230 may decrypt record data included in the record, and may incorporate the decrypted record data into a payload field of one or more TCP packets to be transmitted to collector device 220. In some implementations, network device 230 may identify a record header included in the record, and may determine a record type of decrypted record. In some implementations, network device 230 may incorporate, into the one or more TCP packets, information included in the record header. In some implementations, network device 230 may set a first field of a header of the one or more TCP packets to a first value, and may set a second field in the header of the one or more TCP packets to a second value. In some implementations, network device 230 may transmit the one or more TCP packets to collector device 220.

Application platform 240 includes one or more devices capable of receiving, generating, storing, processing, and/or providing data associated with transmitting different types of encrypted information. For example, application platform 240 may include a server device (e.g., a host server, a web server, an application server, etc.), a data center device, or a similar device. Application platform 240 may be associated with a software application, such as a productivity suite application, a customer relationship management application, and/or the like, such that client device 210 may interact with application platform 240 to interact with the software application, to transmit and/or receive information associated with the application, and/or the like. In some implementations, application platform 240 may transmit a security credential, such as a certificate, a key, and/or the like, to client device 210 so that client device 210 can authenticate application platform 240, and/or vice-versa. In some implementations, application platform 240 may transmit and/or receive encryption context information, such as encrypted alert data, encrypted handshake data, encrypted heartbeat data, other types of TLS information, other types of SSL information, and/or the like.

In some implementations, as shown, application platform 240 may be hosted in cloud computing environment 242. Notably, while implementations described herein describe application platform 240 as being hosted in cloud computing environment 242, in some implementations, application platform 240 may not be cloud-based (i.e., may be implemented outside of a cloud computing environment) or may be partially cloud-based.

Cloud computing environment 242 includes an environment that hosts application platform 240. Cloud computing environment 242 may provide computation, software, data access, storage, and/or other services. As shown, cloud computing environment 242 may include a group of computing resources 244 (referred to collectively as "computing resources 244" and individually as "computing resource 244").

Computing resource 244 includes one or more personal computers, workstation computers, server devices, or another type of computation and/or communication device. In some implementations, computing resource 244 may host application platform 240. The cloud resources may include compute instances executing in computing resource 244, storage devices provided in computing resource 244, data transfer devices provided by computing resource 244, etc. In some implementations, computing resource 244 may communicate with other computing resources 244 via wired connections, wireless connections, or a combination of wired and wireless connections.

As further shown in FIG. 2, computing resource 244 may include a group of cloud resources, such as one or more applications ("APPs") 244-1, one or more virtual machines ("VMs") 244-2, one or more virtualized storages ("VSs") 244-3, or one or more hypervisors ("HYPs") 244-4.

Application 244-1 includes one or more software applications that may be provided to or accessed by one or more devices of environment 200. Application 244-1 may eliminate a need to install and execute the software applications on devices of environment 200. For example, application 244-1 may include software associated with application platform 240 and/or any other software capable of being provided via cloud computing environment 242. In some implementations, one application 244-1 may send/receive information to/from one or more other applications 244-1, via virtual machine 244-2. In some implementations, application 244-1 may include a software application associated with one or more databases and/or operating systems. For example, application 244-1 may include an enterprise application, a functional application, an analytics application, and/or the like.

Virtual machine 244-2 includes a software implementation of a machine (e.g., a computer) that executes programs like a physical machine. Virtual machine 244-2 may be either a system virtual machine or a process virtual machine, depending upon use and degree of correspondence to any real machine by virtual machine 244-2. A system virtual machine may provide a complete system platform that supports execution of a complete operating system ("OS"). A process virtual machine may execute a single program, and may support a single process. In some implementations, virtual machine 244-2 may execute on behalf of a user (e.g., a user of client device 210), and may manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 244-4 provides hardware virtualization techniques that allow multiple operating systems (e.g., "guest operating systems") to execute concurrently on a host computer, such as computing resource 244. Hypervisor 244-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
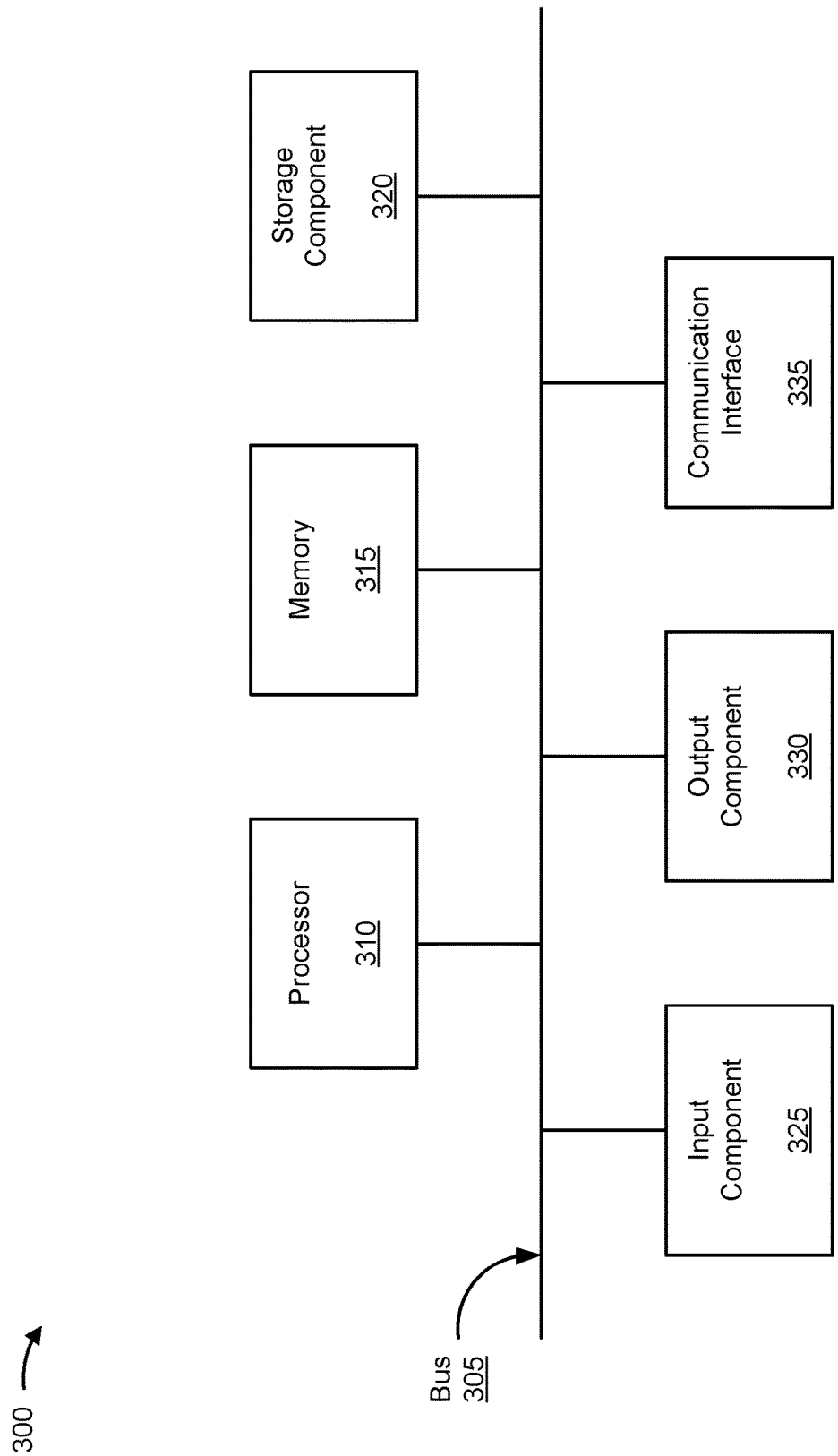
FIGS. 3A and 3B are diagrams of example components of one or more devices of FIG. 2.
Figure 3B:
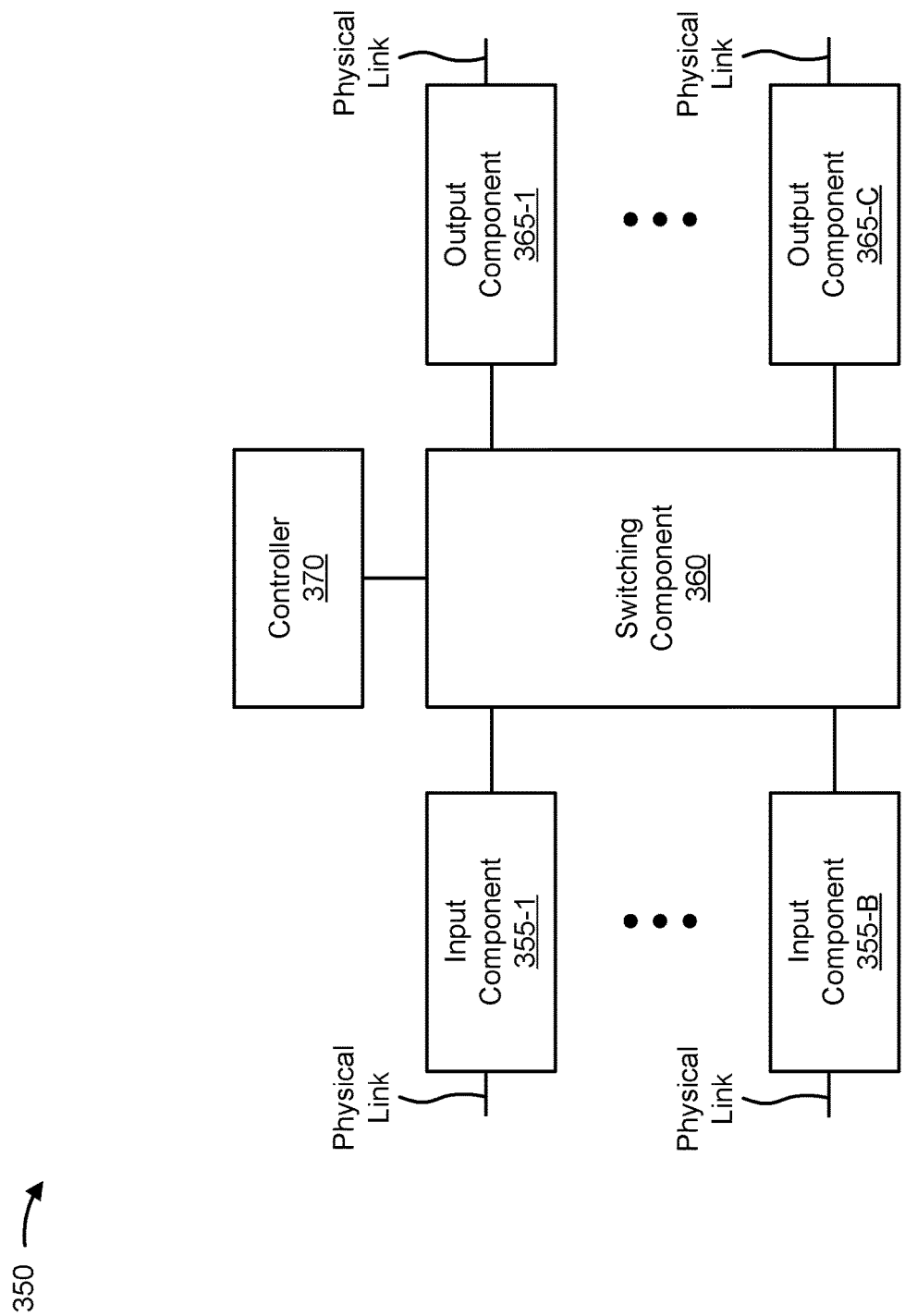

FIGS. 3A and 3B are diagrams of example components of one or more devices of FIG. 2. FIG. 3A is a diagram of example components of a device 300. Device 300 may correspond to client device 210, collector device 220, network device 230, application platform 240, and/or the like. In some implementations, client device 210, collector device 220, network device 230, application platform 240, and/or the like, may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 230. In some implementations, network device 230 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C(C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
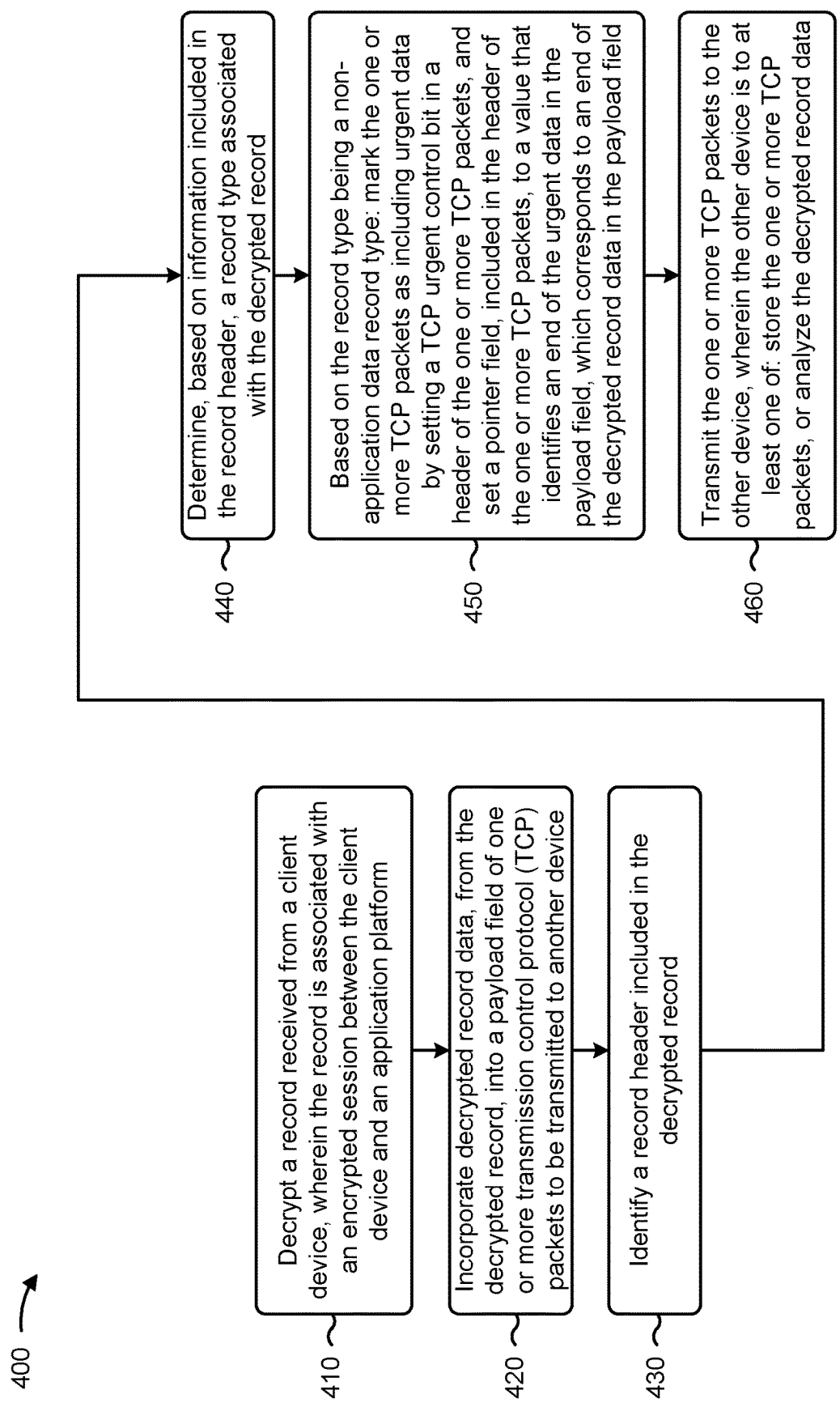
FIG. 4 is a flow chart of an example process for transmitting and storing different types of encrypted information using TCP urgent mechanism.

FIG. 4 is a flow chart of an example process 400 for transmitting different types of encrypted information using TCP urgent mechanism. In some implementations, one or more process blocks of FIG. 4 may be performed by a network device (e.g., network device 230). In some implementations, one or more process blocks of FIG. 4 may be performed by another device or a group of devices separate from or including the network device, such as a client device (e.g., client device 210), a device (e.g., collector device 220), another network device (e.g., another network device 230), an application platform (e.g., application platform 240), a computing resource (e.g., computing resource 244), and/or the like.

As shown in FIG. 4, process 400 may include decrypting a record received from a client device, wherein the record is associated with an encrypted session between the client device and an application platform (block 410). For example, the network device (e.g., using processor 310, memory 315, storage component 320, input component 325, communication interface 335, input component 355, switching component 360, controller 370, and/or the like) may decrypt a record received from a client device, as described above in connection with FIGS. 1A-1C. In some implementations, the record may be associated with an encrypted session between the client device and an application platform.

As further shown in FIG. 4, process 400 may include incorporating decrypted record data, from the decrypted record, into a payload field of one or more transmission control protocol (TCP) packets to be transmitted to another device (block 420). For example, the network device (e.g., using processor 310, memory 315, storage component 320, switching component 360, controller 370, and/or the like) may incorporate decrypted record data, from the decrypted record, into a payload field of one or more TCP packets to be transmitted to another device, as described above in connection with FIGS. 1A-1C.

As further shown in FIG. 4, process 400 may include identifying a record header included in the decrypted (block 430). For example, the network device (e.g., using processor 310, memory 315, storage component 320, switching component 360, controller 370, and/or the like) may identify a record header included in the decrypted record, as described above in connection with FIGS. 1A-1C.

As further shown in FIG. 4, process 400 may include determining, based on information included in the record header, a record type associated with the decrypted record (block 440). For example, the network device (e.g., using processor 310, memory 315, storage component 320, switching component 360, controller 370, and/or the like) may determine, based on information included in the record header, a record type associated with the decrypted record, as described above in connection with FIGS. 1A-1C.

As further shown in FIG. 4, process 400 may include, based on the record type being a non-application data record type, marking the one or more TCP packets as including urgent data by setting a TCP urgent control bit in a header of the one or more TCP packets, and setting a second field, included in the header of the one or more TCP packets, to a second value that identifies an end of the urgent data in the payload field, which corresponds to an end of the decrypted record data in the payload field (block 450). For example, the network device (e.g., using processor 310, memory 315, storage component 320, switching component 360, controller 370, and/or the like) may, based on the record type being a non-application data record type, mark the one or more TCP packets as including urgent data by setting a TCP urgent control bit in a header of the one or more TCP packets, and set a pointer field, included in the header of the one or more TCP packets, to a value that identifies an end of the urgent data in the payload field, which corresponds to an end of the decrypted record data in the payload field, as described above in connection with FIGS. 1A-1C.

As further shown in FIG. 4, process 400 may include transmitting the one or more TCP packets to the other device, wherein the other device is to at least one of: store the one or more TCP packets, or analyze the decrypted record data (block 460). For example, the network device (e.g., using processor 310, memory 315, storage component 320, output component 330, communication interface 335, switching component 360, output component 365, controller 370, and/or the like) may transmit the one or more TCP packets to the other device, as described above in connection with FIGS. 1A-1C. In some implementations, the other device may at least one of: store the one or more TCP packets, or analyze the decrypted record data.

Process 400 may include additional implementations, such as any single implementation or any combination of implementations described below and/or described with regard to any other process described herein.

In some implementations, the encrypted session between the client device and the application platform may be encrypted based on secure sockets layer (SSL) encryption, and/or transport layer security (TLS) encryption. In some implementations, the network device may incorporate the information, included in the record header, into the one or more TCP packets that are to be transmitted to the other device. In some implementations, when incorporating the information, included in the record header, into the one or more TCP packets, the network device may update another value, included in a length field of the record header, that specifies a length of the decrypted record data included in the one or more TCP packets.

In some implementations, the record type associated with the decrypted record type may include an alert record type, a heartbeat record type, and/or a handshake record type. In some implementations, the pointer field may be a TCP urgent pointer. In some implementations, the other device is to store the decrypted record data along with decrypted application data associated with an encrypted session between the client device and an application platform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
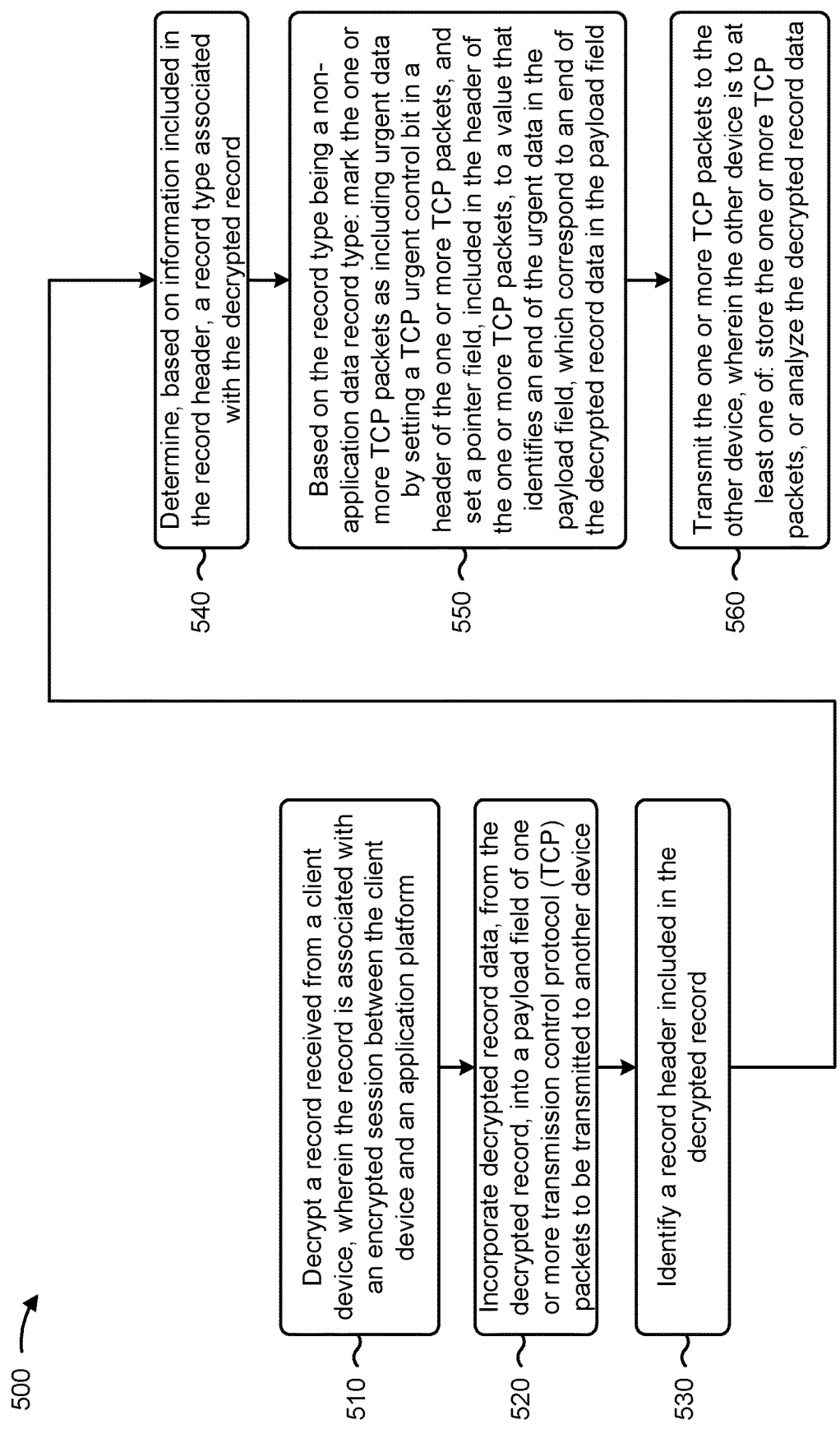
FIG. 5 is a flow chart of an example process for transmitting and storing different types of encrypted information using TCP urgent mechanism.

FIG. 5 is a flow chart of an example process 500 for transmitting different types of encrypted information using TCP urgent mechanism. In some implementations, one or more process blocks of FIG. 5 may be performed by a network device (e.g., network device 230). In some implementations, one or more process blocks of FIG. 5 may be performed by another device or a group of devices separate from or including the network device, such as a client device (e.g., client device 210), a device (e.g., collector device 220), another network device (e.g., another network device 230), an application platform (e.g., application platform 240), a computing resource (e.g., computing resource 244), and/or the like.

As shown in FIG. 5, process 500 may include decrypting a record received from a client device, wherein the record is associated with an encrypted session between the client device and an application platform (block 510). For example, the network device (e.g., using processor 310, memory 315, storage component 320, input component 325, communication interface 335, input component 355, switching component 360, controller 370, and/or the like) may decrypt a record received from a client device, as described above in connection with FIGS. 1A-1C. In some implementations, the record may be associated with an encrypted session between the client device and an application platform.

As further shown in FIG. 5, process 500 may include incorporating decrypted record data, from the decrypted record, into a payload field of one or more transmission control protocol (TCP) packets to be transmitted to the other device (block 520). For example, the network device (e.g., using processor 310, memory 315, storage component 320, switching component 360, controller 370, and/or the like) may incorporate decrypted record data, from the decrypted record, into a payload field of one or more TCP packets that are to be transmitted to another device, as described above in connection with FIGS. 1A-1C.

As further shown in FIG. 5, process 500 may include identifying a record header included in the decrypted record (block 530). For example, the network device (e.g., using processor 310, memory 315, storage component 320, switching component 360, controller 370, and/or the like) may identify a record header included in the decrypted record, as described above in connection with FIGS. 1A-1C.

As further shown in FIG. 5, process 500 may include determining, based on information included in the record header, a record type associated with the decrypted record (block 540). For example, the network device (e.g., using processor 310, memory 315, storage component 320, switching component 360, controller 370, and/or the like) may determine, based on information included in the record header, a record type associated with the decrypted record, as described above in connection with FIGS. 1A-1C.

As further shown in FIG. 5, process 500 may include, based on the record type being a non-application data record type, setting a mark the one or more TCP packets as including urgent data by setting a TCP urgent control bit in a header of the one or more TCP packets, and setting a pointer field, included in the header of the one or more TCP packets, to a value that identifies an end of the urgent data in the payload field, which corresponds to an end of the decrypted record data in the payload field (block 550). For example, the network device (e.g., using processor 310, memory 315, storage component 320, switching component 360, controller 370, and/or the like) may, based on the record type being a non-application data record type, mark the one or more TCP packets as including urgent data by setting a TCP urgent control bit in a header of the one or more TCP packets, and set a pointer field, included in the header of the one or more TCP packets, to a value that identifies an end of the urgent data in the payload field, which corresponds to an end of the decrypted record data in the payload field, as described above in connection with FIGS. 1A-1C.

As further shown in FIG. 5, process 500 may include transmitting the one or more TCP packets to another device, wherein the other device is to at least one of: store the one or more TCP packets, or analyze the decrypted record data (block 560). For example, the network device (e.g., using processor 310, memory 315, storage component 320, input component 325, output component 330, communication interface 335, input component 355, switching component 360, output component 365, controller 370, and/or the like) may transmit the one or more TCP packets to the other device, as described above in connection with FIGS. 1A-1C. In some implementations, the other device may be to at least one of: store the one or more TCP packets, or analyze the decrypted record data.

Process 500 may include additional implementations, such as any single implementation or any combination of implementations described below and/or described with regard to any other process described herein.

In some implementations, the value may further identify a beginning of decrypted application data included the payload field. In some implementations, the other device may store the decrypted record data along with decrypted application data associated with the encrypted session between the client device and the application platform. In some implementations, the record type associated with the decrypted record may include at least one of: an alert record type, a heartbeat record, and/or a handshake record type.

In some implementations, when determining the record type associated with the decrypted record, the network device may determine the record type based on information included in a content type field included in the record header. In some implementations, the network device may incorporate information, associated with the record, into the payload field of the one or more TCP packet. In some implementations, the pointer field may be a TCP urgent pointer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
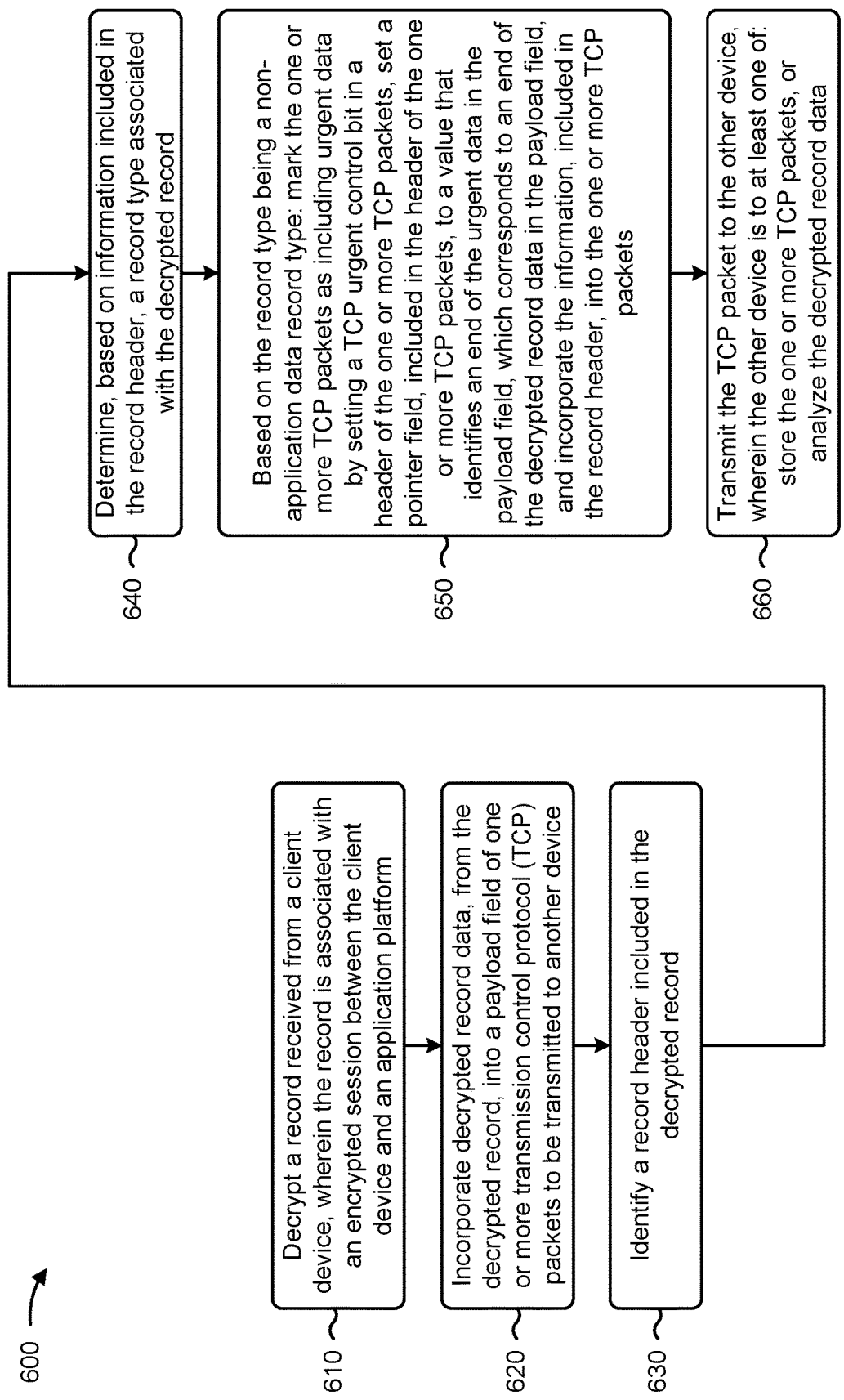
FIG. 6 is a flow chart of an example process for transmitting and storing different types of encrypted information using TCP urgent mechanism.

FIG. 6 is a flow chart of an example process 600 for transmitting different types of encrypted information using TCP urgent mechanism. In some implementations, one or more process blocks of FIG. 6 may be performed by a network device (e.g., network device 230). In some implementations, one or more process blocks of FIG. 6 may be performed by another device or a group of devices separate from or including the network device, such as a client device (e.g., client device 210), a device (e.g., collector device 220), another network device (e.g., another network device 230), an application platform (e.g., application platform 240), a computing resource (e.g., computing resource 244), and/or the like.

As shown in FIG. 6, process 600 may include decrypting a record received from a client device, wherein the record is associated with an encrypted session between the client device and an application platform (block 610). For example, the network device (e.g., using processor 310, memory 315, storage component 320, input component 325, communication interface 335, input component 355, switching component 360, controller 370, and/or the like) may decrypt a record received from a client device, as described above in connection with FIGS. 1A-1C. In some implementations, the record may be associated with an encrypted session between the client device and an application platform As further shown in FIG. 6, process 600 may include incorporating decrypted record data, from the decrypted record, into a payload field of one or more transmission control protocol (TCP) packets to be sent to another device (block 620). For example, the network device (e.g., using processor 310, memory 315, storage component 320, switching component 360, controller 370, and/or the like) may incorporate decrypted record data, from the decrypted record, into a payload field of one or more TCP packets, as described above in connection with FIGS. 1A-1C.

As further shown in FIG. 6, process 600 may include identifying a record header included in the packet (block 630). For example, the network device (e.g., using processor 310, memory 315, storage component 320, switching component 360, controller 370, and/or the like) may identify a record header included in the packet, as described above in connection with FIGS. 1A-1C.

As further shown in FIG. 6, process 600 may include determining, based on information included in the record header, a record type associated with the decrypted record (block 640). For example, the network device (e.g., using processor 310, memory 315, storage component 320, switching component 360, controller 370, and/or the like) may determine, based on information included in the record header, a record type associated with the decrypted record, as described above in connection with FIGS. 1A-1C.

As further shown in FIG. 6, process 600 may include, based on the record type being a non-application data record type, marking the one or more TCP packets as including urgent data by setting a TCP urgent control bit in a header of the one or more TCP packets, setting a pointer field, included in the header of the one or more TCP packets, to a value that identifies an end of the urgent data in the payload field, which corresponds to an end of the decrypted record data in the payload field, and incorporating the information, included in the record header, into the one or more TCP packets (block 650). For example, the network device (e.g., using processor 310, memory 315, storage component 320, switching component 360, controller 370, and/or the like) may, based on the record type being a non-application data record type, mark the one or more TCP packets as including urgent data by setting a TCP urgent control bit in a header of the one or more TCP packets, set a pointer field, included in the header of the one or more TCP packets, to a value that identifies an end of the urgent data in the payload field, which corresponds to an end of the decrypted record data in the payload field, and incorporate the information, included in the record header, into the one or more TCP packets, as described above in connection with FIGS. 1A-1C.

As further shown in FIG. 6, process 600 may include transmitting the one or more TCP packets to the other device, wherein the other device is to at least one of: store the one or more TCP packets, or analyze the decrypted record data (block 660). For example, the network device (e.g., using processor 310, memory 315, storage component 320, input component 325, output component 330, communication interface 335, input component 355, switching component 360, output component 365, controller 370, and/or the like) may transmit the one or more TCP packets to the other device, as described above in connection with FIGS. 1A-1C. In some implementations, the other device may be to at least one of: store the one or more TCP packets, or analyze the decrypted record data.

Process 600 may include additional implementations, such as any single implementation or any combination of implementations described below and/or described with regard to any other process described herein.

In some implementations, the other device may include a data store, a threat detection device, and/or an intrusion detection device. In some implementations, when transmitting the one or more TCP packets to the other device, the network device may transmit the one or more TCP packets to the other device using a port, associated with the network device, that is configured for port mirroring. In some implementations, the record header may include a secure sockets layer (SSL) record header, and/or a transport layer security (TLS) record header.

In some implementations, when decrypting the record, the network device may receive the one or more packets, associated with the record, from the client device, may determine a source or a destination associated with the one or more packets, and may determine to decrypt the record based on the source or the destination associated with the one or more packets. In some implementations, the record header may include a field that includes information identifying the record type.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
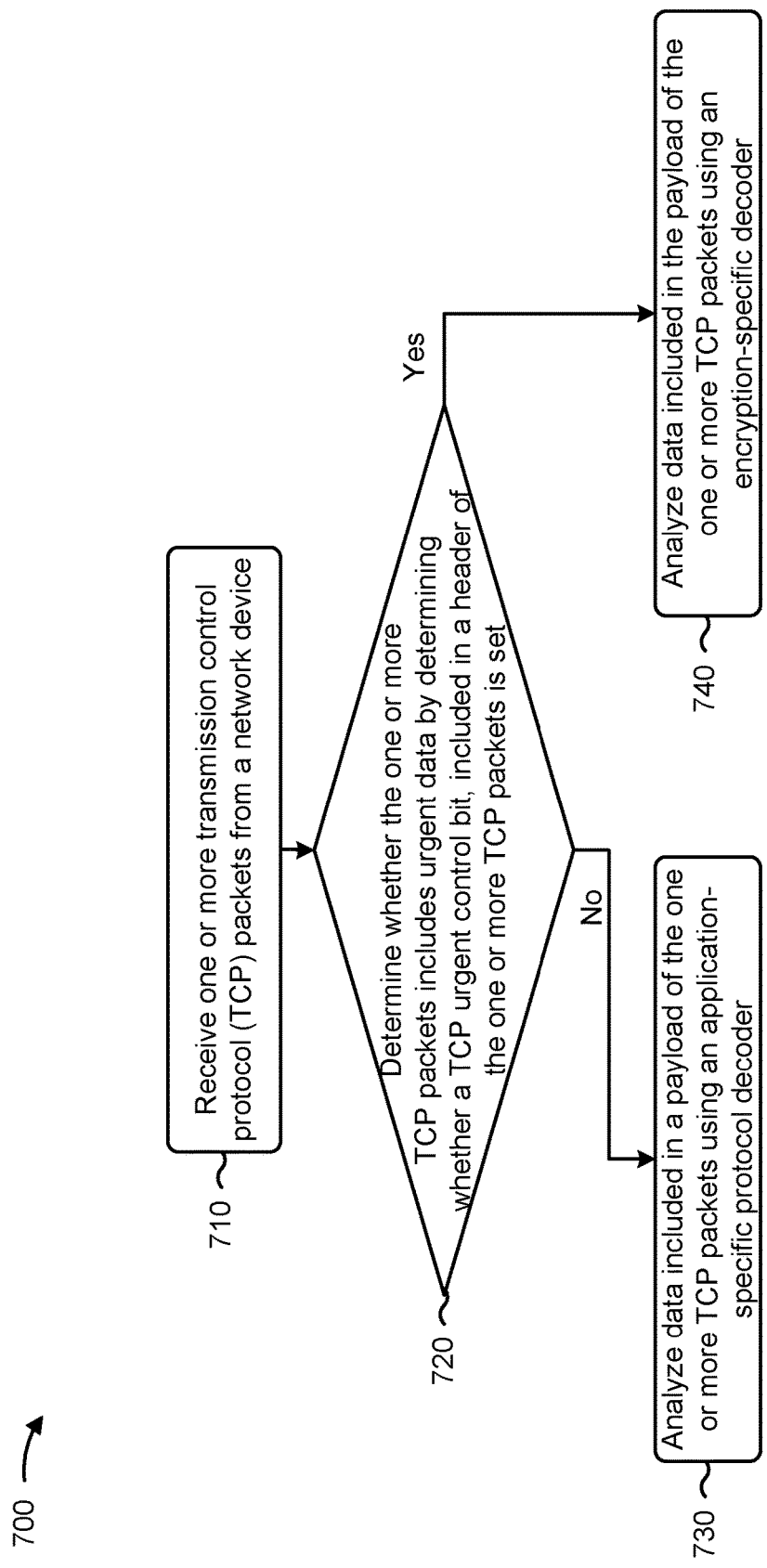
FIG. 7 is a flow chart of an example process for processing decrypted information by a collector device.

FIG. 7 is a flow chart of an example process 700 for processing decrypted information by a collector device. In some implementations, one or more process blocks of FIG. 7 may be performed by a collector device (e.g., collector device 220). In some implementations, one or more process blocks of FIG. 7 may be performed by another device or a group of devices separate from or including the collector device, such as a client device (e.g., client device 210), a network device (e.g., network device 230), an application platform (e.g., application platform 240), a computing resource (e.g., computing resource 244), and/or the like.

As shown in FIG. 7, process 700 may include receiving one or more TCP packets from a network device (block 710). For example, the collector device (e.g., using processor 310, memory 315, storage component 320, input component 325, communication interface 335, input component 355, switching component 360, controller 370, and/or the like) may receive one or more TCP packets from a network device, as described above in connection with FIGS. 1A-1C.

As further shown in FIG. 7, process 700 may include determining whether the one or more TCP packets includes urgent data by determining whether a TCP urgent control bit, included in a header of the one or more TCP packets is set (block 720). For example, the collector device (e.g., using processor 310, memory 315, storage component 320, switching component 360, controller 370, and/or the like) may determine whether the one or more TCP packets includes urgent data by determining whether a TCP urgent control bit, included in a header of the one or more TCP packets is set, as described above in connection with FIGS. 1A-1C.

As further shown in FIG. 7, if the TCP urgent control bit is not set (block 720—No), process 700 may include analyzing data included in a payload of the one or more TCP packets using an application-specific protocol decoder (block 730). For example, the collector device (e.g., using processor 310, memory 315, storage component 320, switching component 360, controller 370, and/or the like) may analyze data included in a payload of the one or more TCP packets using an application-specific protocol decoder, as described above in connection with FIGS. 1A-1C.

As further shown in FIG. 7, if the TCP urgent control bit is set (block 720—Yes), process 700 may include analyzing data included in the payload of the one or more TCP packets using an encryption-specific decoder (block 740). For example, the collector device (e.g., using processor 310, memory 315, storage component 320, switching component 360, controller 370, and/or the like) may analyzing data included in the payload of the one or more TCP packets using an encryption-specific decoder, as described above in connection with FIGS. 1A-1C.

Process 700 may include additional implementations, such as any single implementation or any combination of implementations described below and/or described with regard to any other process described herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a network device 230 that is capable of transmitting encryption context information in a way that prevents the encryption context information from intermingling with decrypted application data. In some implementations, network device 230 may decrypt a record received from a client device 210, and may incorporate decrypted record data, from the decrypted record, into a payload field of one or more transmission control protocol (TCP) packets to be transmitted to a collector device 220. The record may be associated with an encrypted session between client device 210 and an application platform 240. Network device 230 may identify a record header included in the decrypted record, and may determine, based on information included in the record header, a record type associated with the decrypted record. Based on the record type being a non-application data record type, network device 230 may set a first field, included a header of the one or more TCP packet, to a first value that indicates the payload field of the one or more TCP packets includes urgent data, and may set a second field, included in the header of the one or more TCP packets, to a second value that identifies an end of the urgent data in the payload field, which corresponds to an end of the decrypted record data in the payload field. Network device 230 may transmit the one or more TCP packets to collector device 220, which may store the one or more TCP packets, analyze the decrypted record data, and/or the like.

In this way, network device 230 may transmit decrypted encryption context information in one or more TCP packets by setting a field, such as a TCP urgent control bit, in a header of the one or more TCP packets to identify the decrypted encryption context information being transmitted in a payload of the one or more TCP packets. This allows network device 230 to transmit the decrypted encryption context information, along with decrypted application data, in the payload of the TCP packet in a way that does not intermingle the decrypted encryption context information and the decrypted application data. Accordingly, this allows network device 230, collector device 220 (e.g., a network analyzer device, a firewall device, etc.), and/or the like to use the stored decrypted encryption information to perform threat analysis, forensic analysis, and/or the like, which improves the ability of network device 230 and/or the other device to perform the threat analysis, forensic analysis, and/or the like, which in turn improves the security of sessions encrypted using TLS, SSL, and/or the like.

As used herein, the term record may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, one or more transmission control protocol (TCP) packets from another device via an interface configured for port mirroring;
 determining, by the device, whether the one or more TCP packets include urgent data based on determining whether a first field, included in a header of the one or more TCP packets, includes a value that indicates a payload, of the one or more TCP packets, includes the urgent data,
  wherein determining whether the one or more TCP packets include the urgent data comprises determining whether a TCP urgent control bit, included in the header of the one or more TCP packets, is set, and wherein the value is set based on whether the payload includes encryption context data; and analyzing, by the device and based on determining that the one or more TCP packets include the urgent data, the encryption context data included in the payload using an encryption-specific decoder, wherein the device determines a location of the encryption context data based on a second field, included in the header of the one or more TCP packets, that includes a pointer that identifies the location in the payload based on another value identified in the second field that identifies an end of the urgent data in the payload, wherein the end of the urgent data corresponds to an end of the encryption context data in the payload, and wherein the encryption context data includes decrypted non-application data.

2. The method of claim 1, further comprising:
determining where in the payload that decrypted data is located; and
storing, based on determining where in the payload that the decrypted data is located, the decrypted data.

3. The method of claim 2, wherein storing the decrypted data comprises:
storing the decrypted data by an encrypted session.

4. The method of claim 1, further comprising:
determining, based on analyzing the one or more TCP packets, whether there was an attack on an encrypted session between a client device and an application platform; and
identifying a source of the attack based on determining that the encrypted session was attacked.

5. The method of claim 1, further comprising:
determining, based on analyzing the one or more TCP packets, whether there is a vulnerability in an encrypted session between a client device and an application platform; and
identifying a type of the vulnerability based on determining that the vulnerability exists in the encrypted session.

6. A device, comprising:
one or more memories; and
one or more processors communicatively coupled to the one or more memories, configured to:
receive one or more transmission control protocol (TCP) packets from another device via an interface configured for port mirroring;
determine whether the one or more TCP packets include urgent data based on a determination of whether a first field, included in a header of the one or more TCP packets, includes a value that indicates a payload, of the one or more TCP packets, includes the urgent data,
wherein the one or more processors, to determine whether the one or more TCP packets, are configured to include the urgent data comprises determining whether a TCP urgent control bit, included in the header of the one or more TCP packets, is set, and
wherein the value is set based on whether the payload includes encryption context data; and
analyze, based on determining that the one or more TCP packets include the urgent data, the encryption context data included in the payload using an encryption-specific decoder, wherein the one or more processors, when analyzing the encryption context data, are configured to determine a location of the encryption context data based on a second field, included in the header of the one or more TCP packets, that includes a pointer that identifies the location in the payload based on another value identified in the second field that identifies an end of the urgent data in the payload, wherein the end of the urgent data corresponds to an end of the encryption context data in the payload, and wherein the encryption context data includes decrypted non-application data.

7. The device of claim 6, wherein the one or more processors are further configured to:
determine where in the payload that decrypted data is located; and
store, based on determining where in the payload that the decrypted data is located, the decrypted data.

8. The device of claim 7, wherein the one or more processors, when storing the decrypted data, are configured to:
store the decrypted data by an encrypted session.

9. The device of claim 6, wherein the one or more processors are further configured to:
determine, based on analyzing the one or more TCP packets, whether there was an attack on an encrypted session between a client device and an application platform; and
identify a source of the attack based on determining that the encrypted session was attacked.

10. The device of claim 6, wherein the one or more processors are further configured to:
determine, based on analyzing the one or more TCP packets, whether there is a vulnerability in an encrypted session between a client device and an application platform; and
identify a type of the vulnerability based on determining that the vulnerability exists in the encrypted session.

11. A non-transitory computer-readable medium storing instructions, the instructions comprising:
one or more instructions that, when executed by one or more processors, cause the one or more processors to:
receive one or more transmission control protocol (TCP) packets from another device via an interface configured for port mirroring;
determine whether the one or more TCP packets include urgent data based on a determination of whether a first field, included in a header of the one or more TCP packets, includes a value that indicates a payload, of the one or more TCP packets, includes the urgent data,
wherein the one or more instructions cause the one or more processors to determine whether the one or more TCP packets, cause the one or more processors to include the urgent data comprises determining whether a TCP urgent control bit, included in the header of the one or more TCP packets, is set, and wherein the value is set based on whether the payload includes encryption context data; and
analyze, based on determining that the one or more TCP packets include the urgent data, the encryption context data included in the payload using an encryption-specific decoder, wherein the one or more instructions, that cause the one or more processors to analyze the encryption context data, cause the one or more processors to determine a location of the encryption context data based on a second field, included in the header of the one or more TCP packets, that includes a pointer that identifies the location in the payload based on another value identified in the second field that identifies an end of the urgent data in the payload, wherein the end of the urgent data corresponds to an end of the encryption context data in the payload, and wherein the encryption context data includes decrypted non-application data.

12. The non-transitory computer-readable medium of claim 11, wherein the one or more instructions, when executed by the one or more processors, further cause the one or more processors to:
determine where in the payload that decrypted data is located; and
store, based on determining where in the payload that the decrypted data is located, the decrypted data.

13. The non-transitory computer-readable medium of claim 11, wherein the one or more instructions, when executed by the one or more processors, further cause the one or more processors to:
determine, based on analyzing the one or more TCP packets, whether there was an attack on an encrypted session between a client device and an application platform; and
identify a source of the attack based on determining that the encrypted session was attacked.

14. The non-transitory computer-readable medium of claim 11, wherein the one or more instructions, when executed by the one or more processors, further cause the one or more processors to:
determine, based on analyzing the one or more TCP packets, whether there is a vulnerability in an encrypted session between a client device and an application platform; and
identify a type of the vulnerability based on determining that the vulnerability exists in the encrypted session.

15. The method of claim 1, wherein the encryption context data includes one or more of:
encrypted alert data,
encrypted handshake data, or
encrypted heartbeat data.

16. The method of claim 1, further comprising:
transmitting the one or more TCP packets to the other device via the interface configured for port mirroring.

17. The device of claim 6, wherein the encryption context data includes one or more of:
encrypted alert data,
encrypted handshake data, or
encrypted heartbeat data.

18. The device of claim 6, wherein the one or more processors are further configured to:
transmit the one or more TCP packets to the other device via the interface configured for port mirroring.

19. The non-transitory computer-readable medium of claim 11, wherein the encryption context data includes one or more of:
encrypted alert data,
encrypted handshake data, or
encrypted heartbeat data.

20. The non-transitory computer-readable medium of claim 11, wherein the one or more instructions, when executed by the one or more processors, further cause the one or more processors to:
transmit the one or more TCP packets to the other device via the interface configured for port mirroring.

* * * * *